Feb. 24, 1948.   R. B. BOOTH ET AL   2,436,375
CLARIFIER FOR LUBRICATING COOLANTS BY MEANS OF FROTH FLOTATION
Filed April 19, 1943   3 Sheets-Sheet 1

INVENTORS
ROBERT B. BOOTH,
NORMAN MORASH,
BY
Elmer W. Harmon
ATTORNEY

INVENTORS
ROBERT B. BOOTH,
NORMAN MORASH,
BY
Elmer W. Harmon
ATTORNEY

Feb. 24, 1948. R. B. BOOTH ET AL 2,436,375
CLARIFIER FOR LUBRICATING COOLANTS BY MEANS OF FROTH FLOTATION
Filed April 19, 1943 3 Sheets—Sheet 3
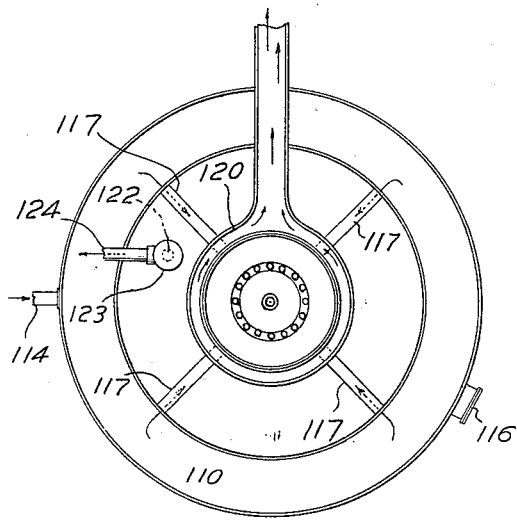
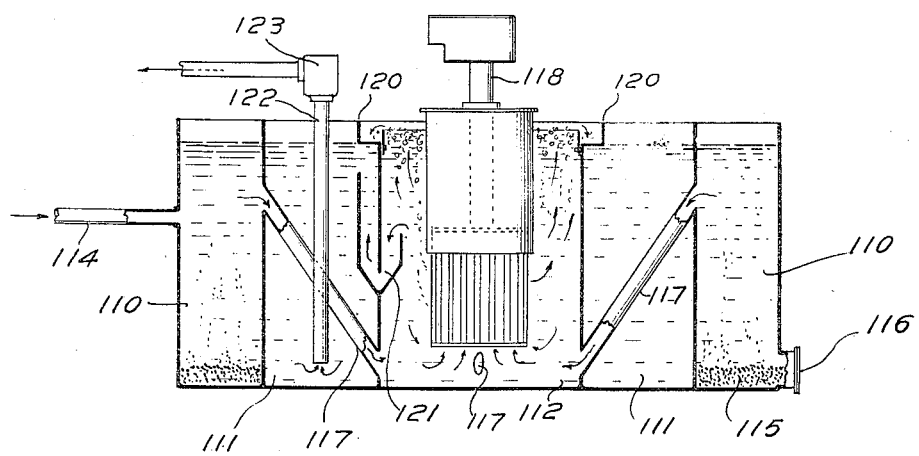
Fig. 5.
INVENTORS
ROBERT B. BOOTH,
NORMAN MORASH,
BY
ATTORNEY Patented Feb. 24, 1948

2,436,375

UNITED STATES PATENT OFFICE 2,436,375

CLARIFIER FOR LUBRICATING COOLANTS BY MEANS OF FROTH FLOTATION

Robert B. Booth, Springdale, and Norman Morash, Stamford, Conn., assignors to American Cyanamid Company, New York, N. Y., a corporation of Maine Application April 19, 1943, Serial No. 483,562

7 Claims. (Cl. 210—53)

This invention relates to an apparatus for and a method of clarifying contaminated solutions, dispersions and emulsions. In particular the invention relates to a clarifier adapted to the removal of foreign matter from lubricating coolants used in conjunction with many different material-modifying operations.

Modern industrial practice involves a great many operations in which various objects are subjected to mechanical treatment, usually to alter their size or shape. Illustrative of such procedures are the familiar operations of brushing, buffing, cutting, drilling, drawing, extruding, grinding, milling, rolling, sawing, tapping, threading and the like. These operations may modify only the external surfaces as in grinding or milling a piece to a specified dimension or in a screw-threading stock. In other cases, a portion of the material may be removed without appreciably altering the external surfaces as in drilling, reaming, internal grinding and tapping operations. In still others, the entire shape of the object may be altered as when a blank is shaped by drawing, extruding, rolling and the like operations. Often, the workpiece is subjected to a plurality of these operations.

Whatever the purpose or nature of these operations and whatever the nature of the material being worked upon, whether metals, alloys, artificial plastics, glass, rubber, mica, porcelain, fibrous products or like materials which may be adapted to modification under such treatment, there is one feature which is common to all. That is the heating of both the material being treated and the operating tool as a result of the friction involved.

This generation of heat is unfortunate since it introduces certain difficulties into the carrying out of the material modifying operations. Among these are for example: the more rapid dulling and wearing of operating tools; difficulties in producing an exact size because of expansion under the influence of heat; spoilage and breakage of workpieces due to unequal expansion under the influence of heat; excessive power consumption; excessive corrosion and the necessity for working at speeds and pressures low enough to prevent excessive heating.

In addition, there is in almost every case an accumulation of what, for the purposes of the present specification, may be called waste products. These waste products may comprise particles, chips or turnings of the material itself, as in cutting or grinding operations, or particles of the operating tool as in the case of grinding. Again, they may comprise corrosion or oxidation products such as rust in the machining of iron or steel; scale, as in the rolling or drawing of metals or oxide films such as occur in drawing or extruding copper, brass, iron or aluminum and the like. Solid wastes, such as chips, turnings, dust, grit and the like, must be removed from around the workpiece and operating tool in order to facilitate working. Also, any corrosion and oxidation products usually must be either prevented from forming or be subsequently removed in order to obtain a final, finished article.

Largely because of these heating and waste accumulation features, it has become common practice in the material-working arts to make use of lubricating and/or cooling fluids to facilitate the working operations. The use of these lubricating coolants is intended to perform one or more of several functions such as to provide lubrication between the operating tool and the workpiece; dissipate heat and so cool the tool and workpiece; reduce the power consumed in carrying out the operation; increase the usable life of the tool; secure a good finish and accurate sizing; prevent corrosion or oxidation and flush or carry away cuttings, chips, grit, dust and the like.

In some cases the cooling function is the more important and in others lubrication is the first consideration. The choice and nature of the fluid will depend, therefore, on the kind of work to be done more than on any other consideration. In almost every case, however, the fluid used performs both cooling and lubricating functions and therefore in the present specification and claims the expressions "lubricating coolant" and "coolant" are used to designate these lubricating and cooling fluids generally.

The nature and constitution of these lubricating coolants may be almost as varied as are the operations in connection with which they may be used. They may comprise simple liquids, water being commonly used, for example, in such operations as the grinding or cutting of rubber and artificial plastics; and kerosene, fuel oil, turpentine and the like in working upon glass and ceramics. Water is also commonly used in connection with drawing, extruding and rolling operations, particularly on metals. In other cases, an alkaline solution such as sal soda in water and/or soap solutions are often used. For still different purposes the use of oils such as mineral oil and fatty oils of the lard or whale oil types, tallow or mixtures of mineral and fatty oils have proved to be of advantage.

Still another type of coolant which is commonly encountered is the so-called "soluble-oil" emulsion. Since these emulsions are most frequently used in cutting, grinding and drawing operations on metals and alloys, for which purposes they were originally prepared, they are also commonly referred to as "cutting-oil" emulsions. These materials usually comprise light-oil solution of various saponified crude fats; various soaps, such as mahogany soap, fatty acid soaps, naphthenic acid soaps; lubricants, including oils and greases; petroleum sulfonates and sulfates, sulfonated oils, etc., wetting agents, anti-oxidants, thinners, etc. As a rule, these soluble-oil solutions are cut with water and emulsified before being used.

In any case, however, the lubricating coolant soon picks up and becomes contaminated with a considerable quantity of waste products. Since these waste product contaminants often have an intrinsic value as, for example, in the case of metal cuttings of copper, bronze, aluminum, and the like, it is often desirable to recover them from the coolant. A still more important reason for removing the contaminants is that their presence always interferes with the efficient performance of the coolant's intended function. This interference may take any of several forms. The presence of foreign matter in the coolant usually reduces its cooling and lubricating capacity and causes scratching or marring of the surface as well as interfering with the proper coolant flow.

Another troublesome type of interference with the coolant's performance occurs in connection with the use of oils and emulsions. It is brought about by the heat of friction sometimes aided by the action of bacteria which cause a breakdown into sludge of the oils themselves or the oils, soaps or other constituents found in emulsion-type coolants. This sludge has a direct effect on the proper performance of the coolant since it not only changes the cooling power of the emulsion but also sharply reduces its lubricating value.

Where the coolant comprises a fluid such as water the recovery of the foreign matter for its intrinsic value is usually the principle reason for treating it. This is particularly true, for example, in cases such as the drawing of wire in which the cooling bath acquires a considerable content of metal oxides, salts and metal particles. Similar instances in which it may be desirable to recover material occur in connection with rolling operations and with many well known washing, pickling or descaling treatments. On the other hand, in many localities it is highly desirable or even necessary to clarify the water which has been used as a coolant for reuse. This is particularly true where large volumes of water are used and it would be necessary to pretreat large volumes of fresh water, if the water in the circuit were not recycled.

Where a compounded lubricating coolant is used, the coolant itself has a definite real value so that its reuse is important in carrying out an economical operation. This is particularly true, for example, in those cases where oils are used as flushing, dipping, cooling or washing baths and where the soluble-oil-type emulsions are used in cutting, drilling, grinding, milling and the like operations on metals. However, the presence of the contaminants definitely limits the reuse of the coolants. There exists, therefore, a definite demand for an apparatus whereby the coolants may be clarified to recover valuable contaminants or to permit the reuse of the coolants.

The importance of the latter point is witnessed by the fact that many operators in spite of previous experimentation or clarification methods, still discard their entire coolant baths after short use in operation. Periodic rejection every eight hours or less is by no means uncommon in doing precision work and is found to be less expensive than the shut down and high percentage of rejects and spoiled work which may result from failure to clarify the coolant.

In the past there has been no satisfactory, efficient, economical and self-contained unit capable of clarifying contaminated flows such as occur in connection with these various lubricating coolant problems. Settling tanks have been used. Many standard grinding and machining devices have such tanks built in as an integral feature. In other cases, central settling systems have been tried. However, neither individual nor central settling systems have proved satisfactory, principally because the large amounts of contaminants which must be removed require either an impractically large settling capacity and/or frequent stoppage of the material-modifying operations in order to clean out the settling vats. Further, in both systems large amounts of coolant are wasted in the cleaning out process.

Centrifugal separation has also been tried but has not proved wholly satisfactory for several reasons. The most troublesome of these include the relatively extensive equipment required to handle large volumes of fluid, the difficulty of applying this clarification method to individual material-modifying machines and the periodic dismantling of the equipment which is required for cleaning the centrifuge.

Filtration also has proved to be generally impractical. This is due to the equipment required, the frequent periodic clean-out necessary, and the fact that many of the materials used as cooling fluids or occurring therein as impurities, particularly extremely fine particles, are not susceptible to successful filtration. Certain filter media such as hair, fiber, mineral matter, etc., may be temporarily cleaned by backwashing but eventually become sufficiently clogged to demand replacement.

In our copending applications, Serial Nos. 443,816 and 457,190 filed May 20, 1942, and September 3, 1942 respectively, it has been shown that in many cases froth flotation can be used as the most effective means, and in many cases is the only practical means of clarifying the contaminated fluids with which the present invention is concerned. These processes in which froth flotation is used, however, possess certain limitations so that they can not be used with maximum efficiency in all fluid-clarifying cases.

Under some conditions the clarification of lubricating coolants presents all of the most troublesome of these limitations, namely a contaminated fluid in which a part of the contaminants tend to settle, a part of the contaminants remain thoroughly dispersed and a final part tends to float. For example, the metal and grit particles may often form oily agglomerates which are difficult to remove by flotation because of their size and oily nature. An attempt to float all the material, including that portion which has a great tendency to sink, presents a number of operational difficulties. Use of flotation machines of excessive capacity may be required in order to treat the material for a sufficient length of time to float the coarse particles and still maintain the necessary flow rate. Or, such a practice may necessitate the use of flotation aids in quantities sufficient to interfere with the desired properties of the clarified fluid.

None of these unit operations therefore presents a perfect solution to all the problems. Flotation, however, is the most adaptable, both to variations in operating conditions and to the development of flexible units. As has been pointed out, this flexibility in use is highly desirable. There exists, therefore, a demand for a unit, capable of handling contaminated fluids when part of the contaminants are difficult to float and other parts are difficult to settle, particularly if rapid settling is required. Preferably too, this unit should be self-contained, adapted for portability, easily built, easily operated and substantially self-cleaning.

It is therefore the principal object of the present invention to provide apparatus which will embody all of these desirable features. In general, this object is accomplished by combining into a single unit the better features of both flotation and settling operations. Provision is made for settling out only those materials which either can be floated only with extreme difficulty or interfere with the flotation by tending to break down the froth. In this way a smaller flotation device may be used or a larger flow can be handled by apparatus previously employed for this purpose. At the same time the disadvantages of settling alone are avoided by making no effort to provide a settling capacity large enough to remove all the contaminants. Thus, a deliberately inefficient settling operation, is used in combination with a deliberately inefficient flotation operation. This permits the development of a unit which operates with ease on larger flows with an overall efficiency equal to or greater than can be obtained when either a settling or flotation operation alone is carried out at its maximum efficiency.

The invention will be more clearly set forth in connection with the accompanying drawings in which:

Figures 4 and 5 are respectively diagrammatic representatives of the plan and elevation views, the elevation being in section, of a horizontal unit in which the elements are concentrically located with respect to each other.

Figure 1:
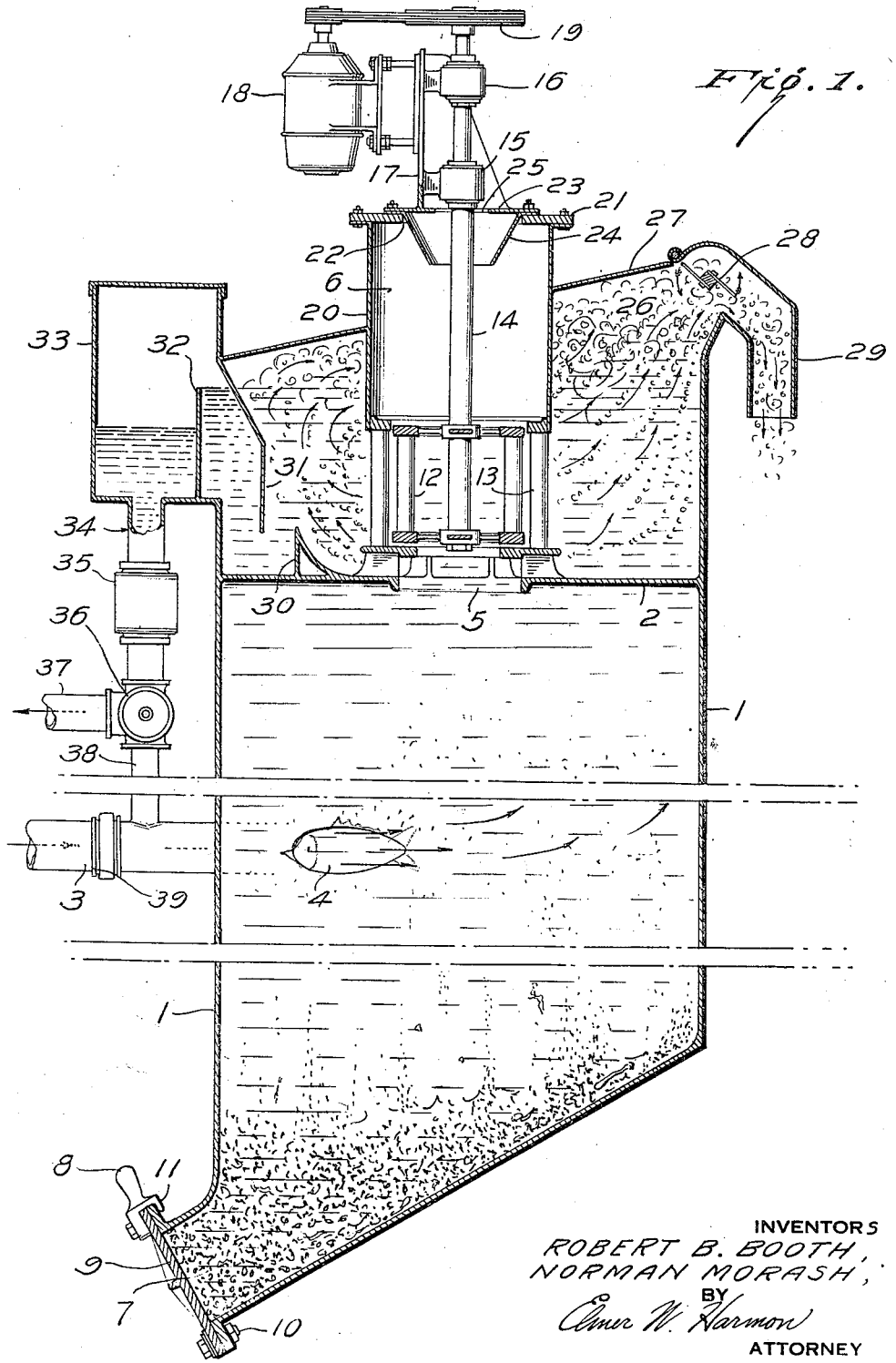
Figure 1 is an elevation, partly in cross-section of one modification of the clarifier of the present invention in which a mechanical type of flotation machine is located in the upper part of a vertical unit.

With reference to Figure 1, the unit is seen to comprise a tank 1 which is divided into two superposed sections by a horizontal plate 2. Contaminated fluid enters the unit from conduit 3 through an inlet 4 located in the side of the tank about midway the height of the lower section. The cross-sectional area of conduit 3 and inlet 4 is such that the necessary flow of contaminated liquid can be readily handled.

While the horizontal cross-section of the unit may be of any desired outline, in the case of those units where settling precedes flotation, the area of the cross-section in which settling occurs is important. For best operation the horizontal cross-sectional area of the settling section should be so proportioned with respect to the average fluid flow through the unit that the upward component of the velocity is less than the free-falling rate of the smallest particles to be collected by settling. In the modification shown in Figure 1, contaminated fluid entering the lower section of tank 1 through inlet 4 and passing upwardly through port 5 in the horizontal partition 2 should therefore have a velocity less than the free-falling rate of those contaminant particles which are just too large to be conveniently handled by the flotation device 6 located in the upper section of the tank and supported therein by the horizontal partition 2. The falling particles gradually settle to the bottom of tank 1 from which they can be periodically removed through port 7 by turning handle 8 to open cover 9 which is normally kept closed by any convenient means such as bolt 10 and latch 11.

Contaminated fluid, from which the readily-settled particles have been removed, flows upwardly through port 5 which is in this case located directly beneath the rotor 12 and stator 13 of a mechanical type of froth flotation device such as used in a Fagergren flotation machine, air being drawn beneath the surface of the liquid by the action of the rotor. In the unit shown in Figure 1, the rotor 12 is mounted on shaft 14 which in turn is supported by bearings 15 and 16 which in turn are mounted on a vertical plate 17. A drive motor 18 is mounted on the reverse face of vertical plate 17 and rotates the shaft 14 by means of a conventional belt and pulley drive 19. Stator 13 is mounted on and supported by the horizontal partition 2 and extends upwardly to a level below that of the liquid in the unit. Stator 13 in turn supports a cylindrical casing 20, the top of which is covered by a horizontal plate 21. A large opening 22 in the center of plate 21 is closed by a second plate 23 which in turn supports the vertical plate 17 and a dependent splash guard 24. Shaft 14 passes through a large central opening 25 in plate 23. Air is drawn into the flotation device through opening 25 by action of the rotor 12.

Under the combined stirring and aerating effect of the flotation device, the remaining contaminants are carried to the surface of the liquid in a froth layer 26. This frothy layer is confined by a sloping cover 27 and guided by the sloping cover to a rotating skimmer 28 by which the contaminant-bearing froth is removed from the unit through conduit 29 and may be collected and disposed of in any suitable manner. Clarified fluid passes out of the upper portion of tank 1 through the baffles 30 and 31 and over the dam 32 into a clarified-liquid holder 33 and passes downwardly therefrom through conduit 34 and is returned to use by pump 35 through conduit 37.

The clarifying unit as a whole operates most efficiently when there is a substantially steady flow of fluid therethrough. Since there will be obviously variations in the load placed upon the coolant clarifying system by the demands of the material modifying operations some means of maintaining uniform flow is desirable for maximum efficiency. In the instant case, a constant flow in the clarification unit is maintained by means of a by-pass and a control valve 36. Conduit 34 connects the fluid holder 33 to pump 35. The inlet of control valve 36 is connected to conduit 37 through which clarified coolant is returned to reuse by pump 35. The exit port of valve 36 is connected through conduit 38 to the inlet conduit 3. In this way, if the flow of incoming contaminated fluid falls below that at which the clarification unit operates best, a part of the clarified fluid is pumped through conduit 38 and is recycled. Check valve 39 prevents reverse flow.

Figure 2:
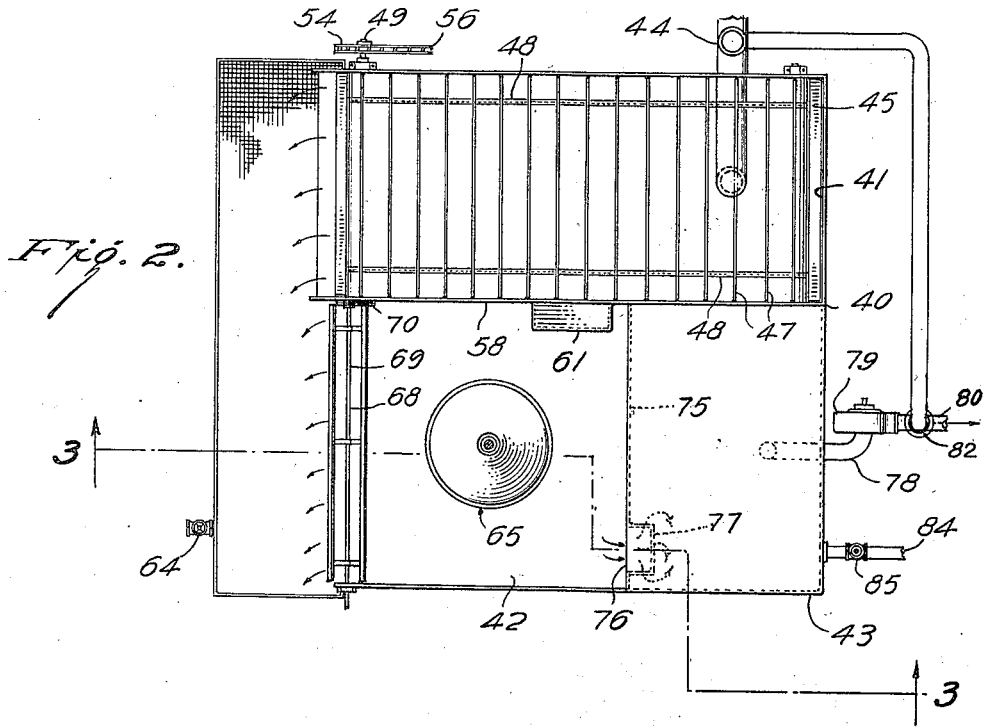
Figure 2 is a plan view of another modification in which the elements are located side by side in a horizontal unit and provision is made for automatically removing the collected contaminants from the unit.
Figure 3:
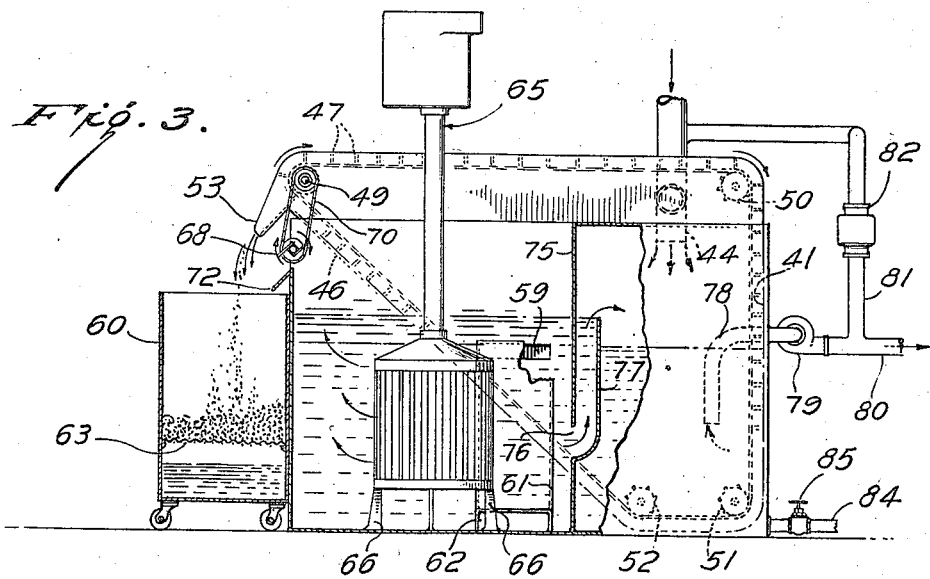
Figure 3 is an elevation of the same modification of Figure 2, being partly in cross-section along line 3—3 of Figure 2.

Although Figure 1 delineates a clarifier in which the parts are vertically grouped, this is not a limitation on the apparatus. Figures 2 and 3 show a differently arranged modification of the clarifying unit in which the various elements are horizontally grouped and in addition provision has been made for the continuous removal of the settled particles. The clarification unit, generically designated as 40, is divided horizontally into three sections 41, 42 and 43 respectively by the partitions 58 and 75. Contaminated fluid enters the unit from feed conduit 44 through a port 45 in one side wall of chamber 41. Again, since settling precedes flotation, the cross-sectional area of the settling chamber is so chosen that the velocity of liquid therethrough is less than the free-falling rate of those contaminant particles which are too large for efficient concentration by the flotation device.

As best seen in Figure 3 the chamber 41 has a flat horizontal floor for part of its bottom and the remainder comprises an upwardly-inclined plate 46. Rakes 47 mounted on endless chains 48 passing around shafts 49, 50, 51 and 52 carry the settled solids up over the inclined plate 46, discharging them over lip 53 into portable tank 60 or some other convenient collecting device. Chains 48 which carry the rakes 47 are motivated by shaft 49 which in turn is motivated by a sprocket 54 driven by chain 56 from some source of power which being conventional and forming no part of the present invention is not shown.

Chamber 41 is separated from flotation chamber 42 by wall 58 which is pierced by port 59 located horizontally about midway and vertically slightly above the lower pass of rakes 47. Port 59 is covered by a baffle 61 which forms with wall 58 a downwardly extending passage through which the fluid passes and is discharged into chamber 42, at a point near the bottom thereof, through port 62 in the flotation-chamber side of baffle 61.

A mechanical type of froth flotation device, of conventional design, generically designated as 65 is mounted on supports 66 in chamber 42. Alternatively, however, the flotation unit may be suspended from a framework at the top of the apparatus, from the ceiling of the room, or in any other convenient manner. The agitating and aerating action of the flotation device causes the contaminants to collect in a froth layer at the top of the liquid. Froth and solids are removed by skimmer 68 mounted on shaft 69 which in turn is rotated by chain 70 through which the shaft 69 is connected to the shaft 49. The contaminant-bearing froth is forced by skimmer 68 over lip 72 into the portable tank 60.

The portable tank 60, although forming no necessary part of the present invention, has been found particularly useful. If so desired this tank may be equipped with a removable strainer 63 upon which the collected contaminants accumulate. Fluid carried by the solids and released by breakdown of the froth drains into the bottom of tank 60 from which it can be removed in any suitable manner, as through the spigot 64, and may be returned to the clarification chamber for clarification prior to reuse. If the solids are to be given a solvent washing, as taught by our previously-mentioned copending application, Serial No. 443,816, the strainer 63 is best formed into a basket suitable for lifting the solids and subjecting them directly to the solvent bath.

Chamber 42 is separated from chamber 43 by a wall 75. Port 76 pierces wall 75 at a point about one-half the height of the liquid level in the apparatus. Baffle 77 in chamber 43 extends from port 76 upwardly to a point approximately the height of the liquid level in the apparatus. Clean fluid thus flows from chamber 42 to chamber 43 without carrying any of the contaminants or froth.

Clean fluid may be withdrawn from the chamber 43 through conduit 78 by means of pump 79 and returned to use through conduit 80. As in the apparatus shown in Figure 1, a flow control by-pass ordinarily also is provided. As shown in Fig. 3, this comprises by-pass conduit 81 which connects conduit 80 to inlet conduit 44 through a control valve 82. Thus the pump and control valve act to equalize the rate of fluid flow through the unit. When the flow of incoming fluid is less than that required for efficient operation, sufficient clarified fluid is recycled to maintain the necessary flow. A conduit 84, normally closed by valve 85 is provided for purposes of draining the tank or to enable the carrying out of decantation operations when so desired.

A further modification in which the settling, storage, and flotation chambers 110, 111 and 112 respectively, are concentrically arranged is diagrammatically represented in Figures 4 and 5. This arrangement of chambers is particularly useful in that it facilitates the allotment to each chamber of a cross-sectional area suitable for the best operation of the function to be performed therein. Contaminated feed enters the outer chamber 110 through conduit 114. Sludge 115 accumulates in the bottom of the chamber and is removed as necessary through the manhole 116. From the outer chamber, fluid passes through a plurality of conduits 117 to the central chamber 112. A conventional flotation apparatus 118 in chamber 112 concentrates the residual contaminants in a supernatant froth layer which overflows into and is removed by the launder 120.

Clarified fluid flows from the central chamber 112 to the intermediate chamber 111 through one or more baffled openings 121 and may be removed and sent to reuse as necessary by means of conduit 122, pump 123 and conduit 124. Although not shown, a proportional by-pass arrangement, analogous to those used in conjunction with the units shown in Figures 1, 2 and 3 is desirable to maintain uniform flow and may be used if so desired.

Figures 4 and 5 illustrate a unit having chambers concentrically placed and separated by circular dividing walls. This is not necessarily a limitation on the present invention. Equally good operation and perhaps better utilization of the floor space may be sometimes obtained when the chambers are either square or oblong in shape and they may be eccentrically spaced if so desired. Nor is it necessary that the chambers be arranged in any particular order, for example, settling may be done in the intermediate chamber.

The operation of the clarifying unit of the present invention is readily apparent from the previous description of the various modifications of the apparatus. In general, contaminated coolant first passes through a chamber in which the rate of flow, or the upward component of that flow, is less than the free-falling rate of those contaminant particles which are large enough to interfere with efficient froth flotation. Thus, only these large particles are removed by settling. The settled particles may be removed in any desired manner, either by hand or by employing one of the modifications in which provision is made for automatic removal.

After this operation, the fluid is subjected to froth flotation. The resultant froth collects substantially all the residual contaminants. This contaminant-bearing froth is overflowed, preferably by the aid of a skimming device, into some collection device and may be given any desirable after-treatment, for example the magnetic, settling or solvent treatments of our copending application, Serial No. 443,816 noted above. Finally, clarified coolant is passed into a storage chamber in which it may or may not be deaerated before being returned to reuse.

In addition to the advantage that the clarifying unit of the present invention may be widely modified to meet various operating demands, it also provides an extremely flexible arrangement suitable for use in different fields. Various types of flotation machines are commercially available with widely varying capacities. It is, therefore, both practicable and feasible to incorporate them into units of varied capacity which can be made part of a closed circuit with each material modifying machine. Thus, for example, where an industrial plant has a number of machines operating on different types of materials, the cuttings or scrap from which have an intrinsic value, each material-modifying machine may have its own clarification unit. In this way scrap from the different types of materials may be recovered separately whenever it is desirable to do so.

On the other hand, a plurality of material-modifying machines may be performing different types of operations on the same material. In such a case all the scrap from the same material may be recovered by means of a closed-circuit centralized system, even though the circuit with the clarification unit may include a plurality of material-modifying machines of the same or different types. It will also be apparent that where mixed types of material in the scrap are either unobjectionable or unavoidable, a centralized system may include not only different types of machines but also those which may be working on assorted materials.

In froth flotation procedures as carried out for example in ore-dressing operations it is customary to make use of various frothers, promoters and modifying agents either to increase the amount of solids which can be floated or to increase the selectivity so that only certain desired portions are caused to float. Ordinarily such problems are not encountered in clarifying coolants since here the peculiar problem of removing substantially all the solids is involved. However, both because the composition of the coolant itself may vary and because the nature of the impurities depends upon the use to which the coolant has been put, the use of the present clarification unit may involve flotation problems which present widely varied aspects.

Coolants of the emulsion type usually present the least difficult problems. As pointed out above, many of these are made from oil containing various soaps. It is often found that samples of contaminated emulsion froth readily when treated in the unit of the present invention and that a good concentration can be had without the use of any additional reagents. When the soluble-oil component of the coolant shows such frothing and collecting power for the contaminants, it is frequently possible to take full advantage of this fact by introducing small amounts of the oil in the clarifying unit. Thus the clarifying operation simultaneously replenishes the oil content lost by spillage, removal on workpieces, etc. The flotation device of the unit is an efficient means of dispersing the new oil in the coolant.

With other types of coolants, however, flotation without the use of reagents may not be effective in removing certain types of valuable contaminants. With materials of this kind it becomes necessary to make use of some froth flotation reagent or combination of reagents to insure a satisfactory result. This is usually true in those cases where water or aqueous solutions are used as coolants. Water itself has no noticeable collecting power and the usual components of aqueous solution coolants seldom include any material adapted to form a suitable froth. Reagents of one type or another are almost certain to be required.

Coolants of the water-immiscible-oil types, present an additional problem. These oils usually froth when subjected to the action of a flotation machine. However, the froth has little or no collecting power. Merely adding a flotation reagent of the ordinary type does not normally solve the problem since successful concentration by froth flotation, using familiar types of reagents, appears to be dependent upon a surface effect which is either inhibited by the oil or is not exhibited by the oil. As set forth in our previously mentioned copending application, Serial No. 457,190, it has been found that since these oils are ordinarily insoluble in, and immiscible with, water they may be mixed with water and temporarily emulsified in passing through the clarifier although the emulsions readily separate into layers on subsequent standing. Emulsion breakers may be used to speed up this separating process, if so desired.

The contaminants are often found to be readily concentrated by the frothing which occurs during the temporary emulsification without the use of additional flotation reagents. Where the contaminants are not of a type adapted to be collected by this action alone, flotation reagents may be added along with the water to produce effective concentration. The units designated in Figures 2, 3, 4 and 5 may be used for this purpose merely by introducing water and/or flotation agents in the flotation chamber. Decantation may be readily carried out in the storage chamber by providing a valve such as that shown at 85 in Figures 2 and 3.

From the foregoing discussion it is apparent that the choice of reagent will depend both upon the results desired and upon the nature of the coolant being treated. In addition, care must be taken that the reagents selected will not, either by their inherent properties or because of the quantity required, modify the properties of the coolant and so interfere with its effective performance of its intended function. In our copending applications, previously noted, the use and limitations of the various types of reagents, frothers, promoter, modifiers and the like have been fully set forth.

It will be apparent therefore that the clarifier of the present invention possesses a number of important advantages over any previously known apparatus. Particularly is this true when it is incorporated into a closed circuit with a material-modifying machine. When used in this way a single unit is capable of handling flows which may vary from a few gallons per minute to as many as several hundred without operational difficulty and maintaining an average clarification of 99.8–99.0 per cent over extended periods of time. Since the unit will handle variations in flows of one hundred per cent or greater without difficulty in use it is found to be highly flexible and requires little attention by an operator.

In addition to the above indicated advantages the use of the present classifier aids in the elimination of certain hazards to the employees. In the use of certain types of coolants particularly those of oil-in-water emulsion types, the art has encountered considerable difficulty due to bacterial action. These bacteria are reported to be of such a nature that they apparently thrive in the small particles of oil and grease which are used as lubricants on the machinery employed in the various operations and eventually in small amounts are introduced into the coolants. This oily material is not removed by commonly used clarification methods and after passing through the clarification apparatus remains in the coolant to act as a contaminant. These bacteria thrive on the materials present in the emulsion and the oil types of coolants. The result is not only the production of objectionable odors but the coolant also often rapidly becomes ineffective in carrying out its intended function. Common practice in the art has been to add a disinfectant or germicide to the coolant to combat the bacterial effect.

The clarifier of the present invention makes an ideal means for introducing these disinfecting materials since they may be added in small quantities during the flotation operation as liquid, solid or gaseous substances and thoroughly disseminated by the action of the machine. In this respect flotation cells which operate on a pneumatic or combined mechanical-pneumatic principle have an added advantage. The vigorous aeration which is inherent in the operation of these types of flotation cells is highly effective in combating the bacterial deterioration of the coolants. In many cases, particularly where a large proportion of the coolant is subjected to flotation this aerating function may be adequate to control further the growth of bacteria without the addition of any disinfecting material.

Workers employed in operations requiring the use of coolants frequently complain of skin eruptions, dermatitis conditions, etc. Medical opinion differs as to whether these conditions are caused by bacteria in the coolant or by clogging of the skin pores by oil. However, cuts and skin junctures are caused by the sharp, minute metal particles in contaminated coolants and frequently become infected and cause lost time. Thus, the high degree of clarity obtained by flotation treatment undoubtedly decreases to a marked extent the probability of cuts and subsequent infection.

We claim:

1. A clarification unit, adapted for the continuous removal of substantially all solid contaminants from lubricating coolant contaminated therewith as the coolant is passed therethrough, said solid contaminants varying in size from those too large for practical concentration by froth flotation to those too small to be practically removed by settling, which comprises the combination of a chamber, partitioning means within said chamber adapted to separate said chamber into at least a first section and a second section; a first conduit means for introducing contaminated coolant into said first section; communicating means adapted to pass coolant from said first into said second sections; said first section having sufficient volume that the normal flow therethrough is substantially non-turbulent and the upward component of the fluid velocity therethrough is less than the falling rate of contaminant particles of a size too large for practical flotation; means within said second section adapted to produce intense aeration and agitation of the coolant therein, whereby the solid contaminants are concentrated in a froth layer above the fluid, said second section being of sufficient volume that the time required to pass a unit volume therethrough is sufficient to permit concentration of substantially all the contaminants therein in said froth layer; said communicating means being so located as to introduce coolant into said second section at a level below the aerating and agitating means; means adapted to continuously remove contaminant-bearing froth from said froth layer substantially at the same rate it is formed and baffled passage means adapted to remove clarified coolant from said second section.

2. A clarification unit according to claim 1 having in combination therewith, means in said first section adapted to continuously remove the settled solids therefrom without substantially altering the flow conditions therein.

3. A clarification unit according to claim 1 having in combination therewith, a by-pass conduit means adapted to introduce clarified coolant removed from said second section into said first conduit means, and a control means in said by-pass conduit, adapted to permit sufficient clarified coolant to be introduced into said first conduit means to maintain a minimum normal flow through said first and second sections.

4. A clarification unit according to claim 1 characterized in that said second section is located immediately vertically above said first section and is separated therefrom by a substantially horizontal partition means, said communicating means being constituted by a central opening in said partition, and the aerating and agitating means being centrally located in said second section vertically above said central opening, whereby communication is established between said sections substantially in alignment with the current of air bubbles rising from said aerating means through the liquid in said second section.

5. A clarification unit according to claim 1, characterized in that said first and second sections of said chamber are separated by substantially vertical partitioning means, said open communication means being constituted by conduit means extending from a point on a level slightly below the upper liquid level in said first section to a point at a level near the bottom of said second section and below said aerating and agitating means.

6. A clarification unit according to claim 1 characterized in that said chamber is formed by a substantially circular floor and a substantially cylindrical wall extending vertically upward from the outer circumference of said floor; in that said first section is an annular space formed by an annular portion of said floor, said outer wall and a second substantially concentric circular wall within said outer wall; in that said second section containing said agitating and aerating means is a cylindrical space formed by the circular center section of said floor and a third cylindrical wall concentrically located within said second cylindrical wall; said chamber being divided by said cylindrical walls into an outer annular first section and an inner cylindrical second section, said first and second sections being separated by an annular intermediate section serving as a storage section for clarified coolant; in that said open communicating means comprise a plurality of enclosed conduit means extending from points at a level slightly below the liquid level in the outer first section downwardly and inwardly through said intermediate storage section to open ports at a low level in the wall of said inner chamber below said aerating and agitating means.

7. A clarification process adapted for the continuous removal of substantially all the solid contaminants from lubricated coolants contaminated therewith, at least a portion of which are incapable of practical removal by settling, filtration, or centrifugal separation, which comprises the steps of passing contaminated coolant through a non-turbulent zone and into a turbulent second zone, the upward component of the fluid velocity in said non-turbulent zone being less than the falling rate of contaminants too large for practical concentration by froth flotation, whereby said oversize contaminants are dropped from suspension before entering the turbulent zone; subjecting the fluid in said turbulent second zone to aeration and agitation, whereby the solid contaminants entering said zone are concentrated in a supernatant froth layer, the flow rate through said turbulent second zone being sufficiently low to permit time for the concentration of substantially all the entering contaminants; removing contaminant-bearing froth from said froth layer, substantially at the same rate at which said layer is formed; continuously removing decontaminated coolant from said second zone; and removing settled particles from said first zone without substantially altering the fluid flow conditions therein.

ROBERT B. BOOTH.
NORMAN MORASH.

REFERENCES CITED

The following references are of record in the file of this patent:

UNITED STATES PATENTS

| Number | Name | Date |
| --- | --- | --- |
| 2,065,722 | Munro | Dec. 29, 1936 |
| 1,937,837 | Munro | Dec. 5, 1933 |
| 1,124,855 | Callow et al. | Jan. 12, 1915 |
| 1,480,379 | Elliott et al. | Jan. 8, 1924 |
| 1,990,458 | Marshall | Feb. 5, 1935 |
| 1,251,621 | Barber | Jan. 1, 1918 |
| 1,136,485 | Rork | Apr. 20, 1915 |
| 1,194,933 | Barber | Aug. 15, 1916 |
| 1,366,767 | Callow | Jan. 25, 1921 |
| 2,242,139 | Munroe | May 13, 1941 |
| 2,274,658 | Booth | Mar. 3, 1942 |
| 2,324,400 | Kelly et al. | July 13, 1943 |

FOREIGN PATENTS

| Number | Country | Date |
| --- | --- | --- |
| 457,149 | Great Britain | Nov. 23, 1936 |
| 10,867 | Great Britain | 1904 |
| 33,200 | Sweden | July 10, 1912 |